United States Patent
Khalid et al.

(10) Patent No.: US 9,857,968 B2
(45) Date of Patent: Jan. 2, 2018

(54) WEARABLE ARTICLE WITH DISPLAY

(71) Applicant: Verizon Patent and Licensing Inc., Arlington, VA (US)

(72) Inventors: Mohammad Raheel Khalid, Basking Ridge, NJ (US); Paul Berman, Basking Ridge, NJ (US); Marlene Kay Enright, Basking Ridge, NJ (US); Cory Michael Bruno, Basking Ridge, NJ (US); Christian Egeler, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 362 days.

(21) Appl. No.: 14/727,973

(22) Filed: Jun. 2, 2015

(65) Prior Publication Data

US 2016/0357384 A1  Dec. 8, 2016

(51) Int. Cl.
  *G06F 3/0488* (2013.01)
  *H04W 4/00* (2009.01)
  *H04B 5/00* (2006.01)
  *H04M 1/725* (2006.01)
  *G06F 3/0481* (2013.01)
  *G06F 1/16* (2006.01)

(52) U.S. Cl.
  CPC ............ *G06F 3/0488* (2013.01); *G06F 1/163* (2013.01); *G06F 1/1643* (2013.01); *G06F 3/04817* (2013.01); *H04B 5/0031* (2013.01); *H04M 1/7253* (2013.01); *H04W 4/008* (2013.01); *H04M 1/72566* (2013.01); *H04M 1/72569* (2013.01); *H04M 1/72572* (2013.01)

(58) Field of Classification Search
  None
  See application file for complete search history.

(56) References Cited

U.S. PATENT DOCUMENTS

| | | | |
|---|---|---|---|
| 8,896,526 B1 * | 11/2014 | Park | G04C 3/002 345/156 |
| 2014/0092108 A1 | 4/2014 | Moon et al. | |
| 2014/0280578 A1 * | 9/2014 | Barat | G06F 15/17312 709/204 |
| 2015/0193130 A1 * | 7/2015 | Cho | G06F 3/04842 715/716 |
| 2016/0327915 A1 * | 11/2016 | Katzer | G04B 19/04 |

* cited by examiner

*Primary Examiner* — Tuan S Nguyen

(57) ABSTRACT

A supplemental display unit may provide information to a display associated with a wearable article. The supplemental display unit may share a communications channel with a mobile device, and exchange data with the mobile device over the communications channel while the mobile device resides within the wearable article. The supplemental display unit may generate a screen having a graphical user interface (GUI) based on the exchanged data, where an appearance of the screen is based on a measurement of the wearable article. The supplemental display unit may provide icons on the GUI presenting information to the user, where the icons may be arranged in groups based upon the type of information that each icon presents, and provide the GUI to the display, where the display is coupled to the wearable article.

18 Claims, 11 Drawing Sheets

500A

US 9,857,968 B2

WEARABLE ARTICLE WITH DISPLAY

BACKGROUND

Wearable devices have seen increased popularity as computer technologies become more power efficient and continue to shrink in size, and as developers experiment with new form factors and human interfaces. For example, recent developments in head mounted computers with optical interfaces, smart watches, activity trackers, etc., have started gaining significant attention from consumers. However, because such devices tend to emphasize function and performance over style, wearable devices currently appeal more to early technology adopters than to consumers.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to wearable articles having a supplemental display unit (SDU) which is readily visible upon viewing the exterior of the wearable articles. The SDU may display content based on information received from an existing mobile device that may be proximate the wearable article. For example, information may be exchanged with the mobile device while stowed within the wearable article. The mobile device may exchange information with the SDU over a wireless connection and/or a wired connection. In an embodiment, the proximity noted above may be based on a wireless standard (e.g., Bluetooth LE) used by the mobile device to exchange information with the SDU. The received information may include, for example, call and/or text message notifications, calendar items, status information regarding the mobile device, etc. Additionally or alternatively, other information for display may be generated by the SDU itself based on sensors within the SDU, and/or in conjunction with information received by the mobile device (e.g., position). Such information may include contextual information (e.g., travel and/or promotional information) and/or information providing an inventory of the contents (e.g., keys, wallet, etc.) within the wearable article. Regardless of the information source, the SDU may integrate, format, and/or display information as viewable content so that it may be quickly interpreted by the user without having to open the wearable article to access the mobile device and/or other contents therein.

Accordingly, the content is presented by the SDU in a "glanceable" manner, wherein a "glance" may be defined herein as a viewing only requiring a small amount attention by the user. For example, a glance may be based on a viewing period ranging from fractions of a second to several seconds (e.g., less than 10 seconds) to be seen and interpreted by the user.

As used herein, in one embodiment, a wearable article may be defined as a container or case which may be carried by a user, typically with the assistance of a supporting strap and/or a handle. Accordingly, the wearable article may be defined broadly herein as a handbag, a purse, a tote, a carryall, a satchel, a hobo bag, a shoulder bag, a messenger bag, a backpack, a clutch, a reticule, a briefcase, etc. In other embodiments, the wearable article may be an item worn on a person, and thus include an article of clothing (e.g., a shirt, pants, a dress, socks, etc.), or an accessory (e.g., a hat, a belt, etc.).

Figure 1A:
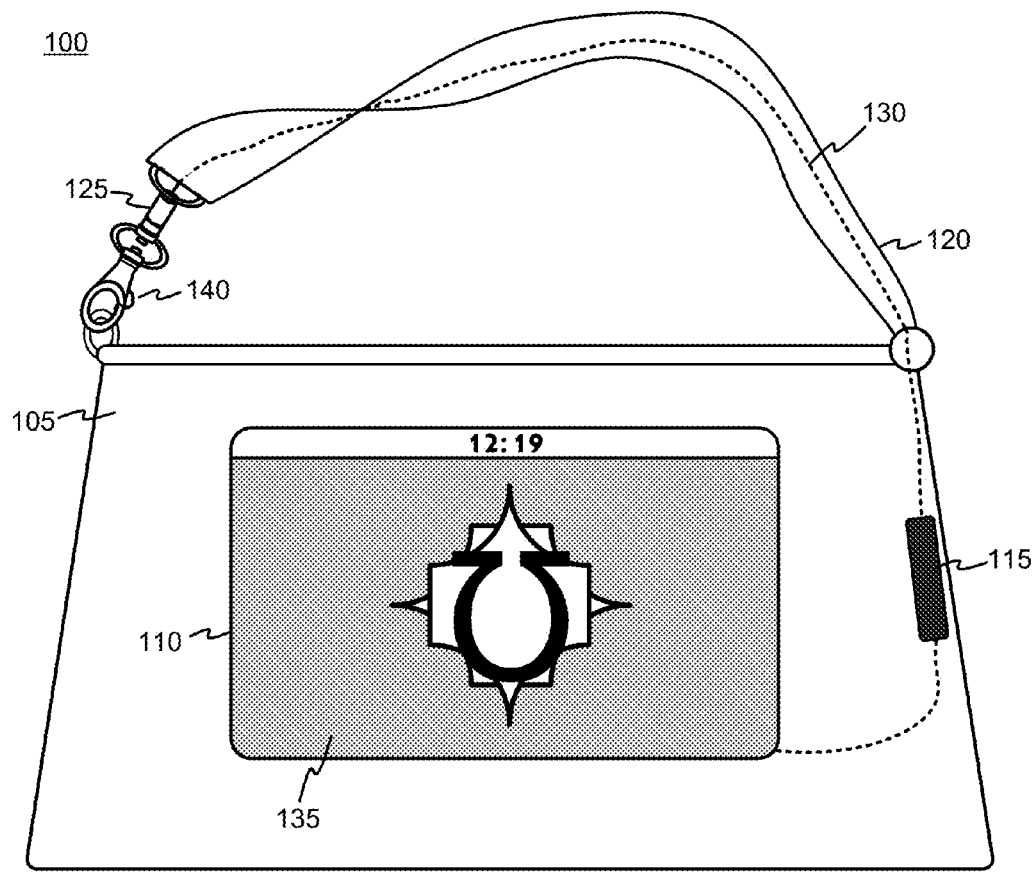
FIG. 1A illustrates the exterior of an exemplary wearable article with a supplemental display unit (SDU) consistent with an embodiment.

FIG. 1A illustrates the exterior of an exemplary wearable item embodied as a handbag 100. Handbag 100 may include a case 105, an SDU 110, a battery 115, and a strap 120. Strap 120 may include an electrical connector 125 concealed in the mounting hardware of buckle 140, and electrical cabling 130 which may be concealed in strap 120.

In one embodiment, SDU 110 may be integrated into case 105 by design, and thus SDU 110 may be fixedly or removeably attached to case 105. For example, SDU 110 may mounted in alignment with an aperture fabricated into the side of case 105 as shown in FIG. 1A. For example, SDU 110 may slide into a pre-sewn pocket of case 105, or may be fixed using fasteners such as, for example, magnetic fasteners and/or mechanical fasteners, and thus may be removed by the user. Mechanical fasteners may include, for example, snaps, zippers, buttons, clips, and/or Velcro strips. In another embodiment, SDU 110 may be permanently attached to case 105 behind an aperture so the SDU 110 may be viewed. For example, SDU 110 may be sewn and/or fastened in place, and thus not be removable by the user. If SDU 110 includes flexible display, the flexible display may be sewn or otherwise grafted to the material of handbag 100, or, more generally, for any wearable article, such as, for example, a shirt, a coat, etc.). The flexible display may serve as the material for construction of at least a portion of a wearable article (e.g., the flexible display could be used to cover one or more sides of handbag 110). In another embodiment, SDU 110 may also be retrofitted onto an existing wearable article which was not originally designed to function with the SDU 110. In such an embodiment, SDU 110 may be affixed onto a wearable item using mounting hardware which may be generic (e.g., a clip built into SDU 110), or may be tailored for a specific wearable article, by fixing clips, zippers, magnets, Velcro, and/or other mounting hardware to the wearable article and/or SDU 110.

SDU 110 may incorporate various electronic components for communicating with other mobile devices, such as, for example, mobile phones, tablets, laptops, etc. Some electronic components, which will be discussed in more detail below in relation to FIG. 3, may include a display, a processor, memory, sensor(s), and/or communication interface(s) for exchanging information with one or more mobile devices. SDU 110 may format information received from the mobile device(s) for presentation on the display. During operation with SDU 110, the mobile device(s) may be carried in handbag 100 using pocket(s) and/or mounting point(s) provided within case 105. The information between the mobile device(s) and SDU 110 may be transferred over a wireless interface (e.g., Bluetooth Low Energy (LE)) and/or over a wired interface (e.g., universal serial bus (USB)), which will be discussed in more detail below in relation to FIG. 2.

SDU 110 may include an on-board power supply (e.g., a battery) integrated into the case of SDU 110. Additionally or alternatively, battery 115 housed within handbag 100 may replace or supplement the on-board power supply of SDU 110, to supply operating power and/or charge the on-board battery of SDU 110. Moreover, battery 115 may also be used to provide power to mobile device(s) being stowed in case 105. Handbag 100 may include additional hardware (not shown) to supplement and/or improve the functionality and/or performance of SDU 110, which may include additional communications hardware. Such hardware may include, for example, antennas and/or other electronics to extend, boost, or provide the ability to send and/or receive various types of wireless signals. Such signals may include, for example, those associated with WiFi, cellular, near field communications (NFC), Bluetooth, and/or any RF signal.

The display of SDU 110 may include a low voltage device which may be referred to as a static display. A static display may maintain an image on a screen until it is updated without having to be dynamically refreshed. In an embodiment, SDU 110 may include a touch sensitive "e-Ink" display which is a static display having good visibility in bright light and low power consumption. The display may include a capacitive or pressure based touch interface, and thus may receive touch inputs from the user. As will be discussed below in the description of FIGS. 5A-5E, the display of SDU 110 may provide a number of different screens presenting graphical user interfaces, which may present a variety of information to the user and/or receive touch input from the user.

In an embodiment, SDU 110 may also present a "privacy screen" which may be displayed as a default display when SDU 110 may be in sleep mode, or when otherwise commanded by the user, to blend in with handbag 100 and protect others from viewing and/or accessing personal information in SDU 110 and/or the mobile device(s) placed within case 105. The privacy screen may be based on the design of handbag 100. FIG. 1A illustrates an exemplary privacy screen 135 which provides a decorative display that may be provided by the handbag manufacturer (that could include a company logo as shown in FIG. 1A) and provide minimal information such as the time. In other embodiments, the privacy screen, as well as any other screen, may be customized by the user. Content for the privacy screen may include personal photographs in the library of the user's mobile device, or content that may be downloaded from a network device hosting an online store which provides applications and/or themes for handbag 100. An exemplary networked device which may host applications and/or themes is described below in relation to FIG. 2.

Additionally, as will be described in more detail in FIG. 3, SDU 110 may also include one or more sensor devices (hereinafter "sensor(s)") which may measure designs, patterns, textures, and/or colors of the exterior material of the handbag. For example, the sensor(s) may include a colorimeter, which may measure the colors of the material surrounding SDU 110 of handbag 100 that may be used to generate a decorative screen to match, blend, and/or contrast the displayed screen of SDU 110 to the exterior of handbag 100 (or in other embodiments, the exterior of any wearable article). Additionally or alternatively, the sensor(s) may include an imaging device which may determine a pattern and/or a texture of the exterior of handbag 100. For example, the sensor(s) may determine a grain pattern associated with the leather used for handbag 100. SDU 100 may generate a graphic texture to match, blend, or contrast the pattern and/or texture of the exterior of handbag 100 (or in other embodiments, the exterior of any wearable article). The sensor(s) may monitor lighting conditions of a wearable article and update brightness, color, contrast, and other video parameters for SDU 110 to use to achieve the matching, blending, or contrasting effect. Such a customization feature which can be readily performed by the user may be especially useful when SDU 110 is retrofitted onto an existing handbag which was not originally manufactured to accommodate SDU 110. The sensor(s) (e.g., colorimeter) may be built-in to SDU 110, for example, by utilizing an integrated device (e.g., a camera) along with additional software to provide matching (e.g., color, pattern, and/or texture matching) functionality. In another embodiment, the sensor(s) may include one or more removable accessories (hereinafter referred to as a "removable sensor") to SDU 110 that may, for example, be connected to SDU 110 to perform the decorative matching with handbag 100, and removed thereafter. The connection to SDU 110 may be accomplished through a wireless or wired connection. Moreover, the removable sensor may have the flexibility to function with other devices in addition or as an alternative to SDU 110 and handbag 100 to perform decorative matching in other contexts. For example, the removable sensor may be used adjust the display of any monitor or display (e.g., a computer, mobile device, big-screen television, etc.) based upon a measurement of some arbitrary object (e.g., wallpaper, clothing, cabinet, furniture, etc.).

In addition to providing interconnection hardware to communicate with the stowed mobile device(s), handbag 100 may further include one or more power connections to provide operating voltage to the mobile device(s), and/or for charging the batteries within the mobile device(s). The power connections may include standard wired interfaces, such as, for example, USB connectors, lightning connectors, or other standard power/data connectors. Additionally or alternatively, the power connection(s) may include inductive charging interfaces which may charge a mobile device wirelessly when the mobile device is appropriately configured with an interface designed for inductive charging.

Figure 1B:
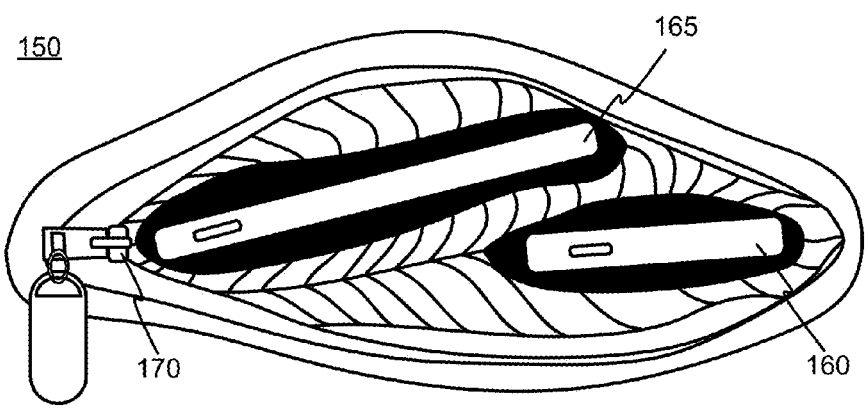
FIG. 1B illustrates an interior of an exemplary clutch which may be used with the wearable article of FIG. 1A in another embodiment.

FIG. 1B illustrates an interior of an exemplary clutch 150 which may be used with handbag 100 in another embodiment. Clutch 150 may include pockets for storing one or more mobile devices, such as, for example, a mobile phone 160, and/or a tablet 165, and be placed inside handbag 100 to stow the mobile devices. Clutch 150 may closed by zipper 170 to safely store the mobile device(s), and can facilitate quick and convenient insertion and/or removal of the mobile device(s) into and/or out of case 105. Clutch 150 may be especially useful when multiple mobile devices are being carried, as all of the mobile devices may be placed or removed to/from case 105 by a single action performed by the user. Clutch 150 may also be secured by the user to safely store mobile device(s), where the security mechanism may be activated/deactivated based on the proximity to another device. For example, clutch 150 may be locked or unlocked based on a proximity of a watch, ring, handset, and/or other device carried or otherwise associated with a user. The proximity may be based on the particular characteristics of a wireless sensor and/or protocol used to implement the security mechanism. Clutch 150 may be constructed using material which may protect the mobile device(s) from shock while permitting wireless exchange of information between SDU 110 and the mobile device(s). Moreover, inductive charging may be used to charge the mobile device(s) when clutch 150 is being used. For example, an inductive charger may be built into case 105 and operate wirelessly though clutch 150 to directly charge mobile device(s) which are configured for inductive charging. In another embodiment, an inductive "receiver" may be built into clutch 150 to receive power inductively from an inductive charger in case 105. The inductive receiver may convert the electromagnetic waves received from the inductive charger in case 105 to electrical power which may be provided over wired connection(s) to mobile device(s). In another embodiment, clutch 150 may be configured with an electrical interface which may be connected to case 105, which in turn could be used to provide power to the mobile devices over a secondary wired connection. In either embodiment, configuring clutch 150 to provide electrical connections to the mobile device(s) carried within clutch 150 permits charging and/or providing operating power to mobile device(s) that are not configured for direct inductive charging. Alternatively, clutch 150 may have a separate battery built therein to provide power to mobile devices. Clutch 150 may be stored in a particular pocket or storage area in case 105, and can be specifically tailored to accommodate particular sizes of various mobile devices, while having a standard external form factor which may be consistent for compatibility with a particular handbags, and/or be a standard across a range of different handbags. Accordingly, when a user upgrades a mobile device to one having a different size, a corresponding clutch 150 may also be purchased to fit the mobile device which will continue to properly fit within an existing or "legacy" handbag.

Figure 1C:
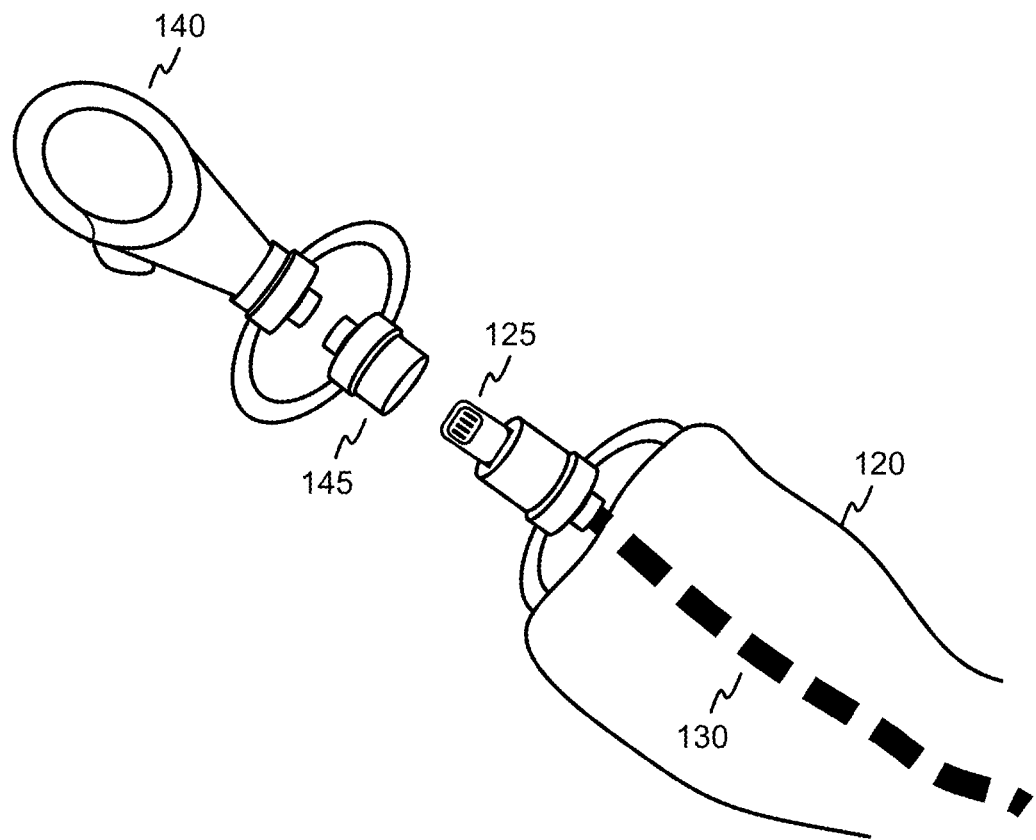
FIG. 1C illustrates an exemplary strap of the wearable article of FIG. 1A which includes a concealed electrical interface.

FIG. 1C illustrates an exemplary strap 120 of the handbag of FIG. 1A which includes a concealed electrical interface 125. Electrical interface 125 may be concealed and removeably attached to cap 145. Cap 145 which may be attached to buckle 140 in a manner that may accommodate the twisting of strap 120 without stressing electrical cable 130. Cap 145 may snap or screw onto electrical interface 125, in a sufficiently secure manner so as to support the weight of case 105 which may be loaded with items. Electrical interface 125 may be used to plug into a powered receptacle to operate and/or charge the internal battery SDU 110, the mobile device(s) stowed in case 105, and/or charge the optional internal battery 115. Electrical interface 125 may also be used to provide a data connection to SDU 110 and/or stowed mobile device(s) to provide software and/or operating system updates, and/or backup synchronization. The electrical interface 125 may be a USB interface (e.g., any variant of USB, include micro USB, USB 3, etc.), a lightning interface, a thunderbolt interface, or any suitable interface which may support the power and/or data requirements of SDU 110 and/or the stowed mobile device(s).

Figure 2:
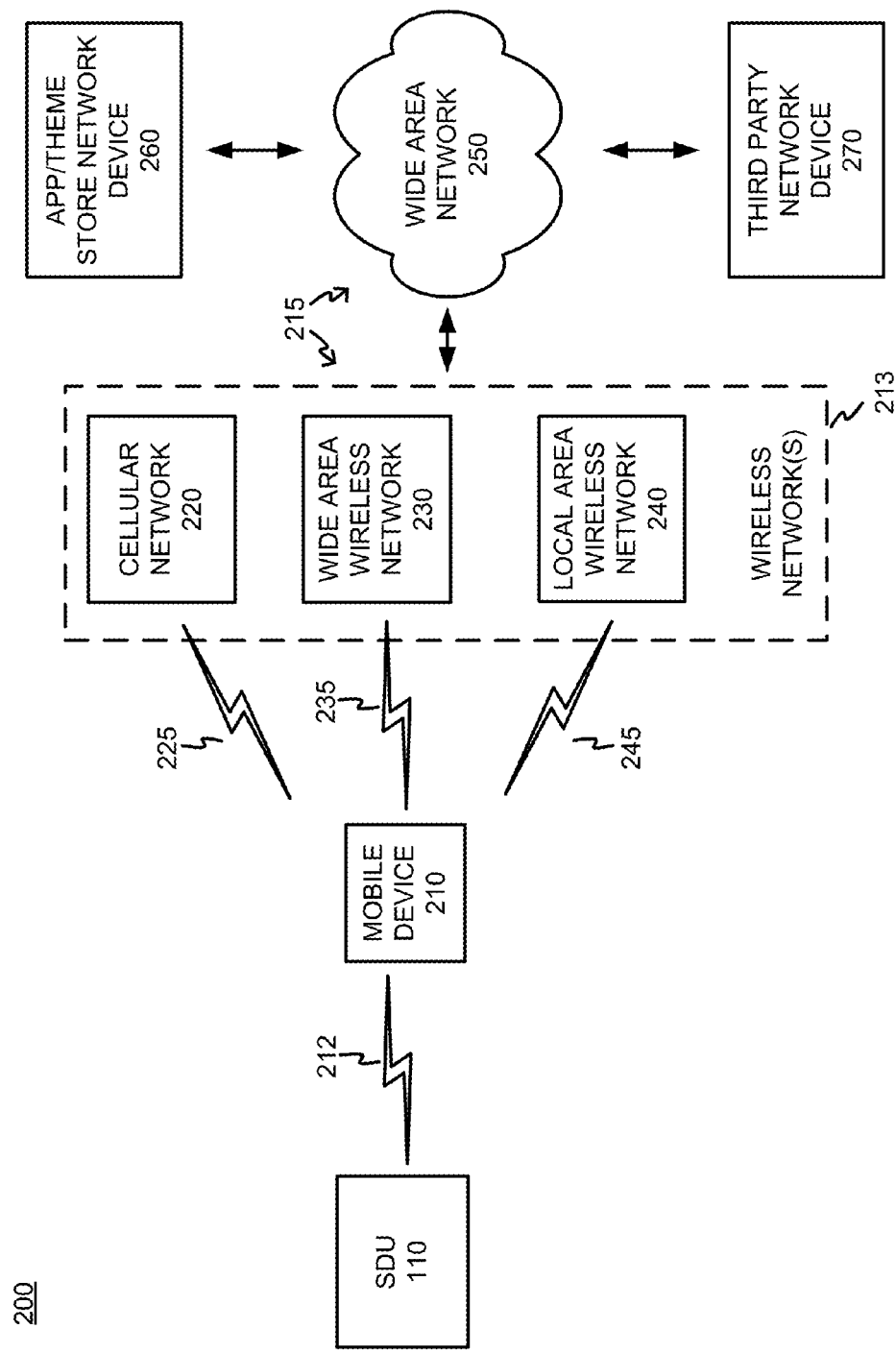
FIG. 2 is a block diagram showing an exemplary networking environment associated with the SDU.

FIG. 2 is a block diagram showing an exemplary networking environment 200 associated with SDU 110. Network environment 200 may include SDU 110, one or more mobile devices 210, network 215, app/theme store network device 260, and third party network device 270. Network 215 may include one or more wireless network(s) 213 and a wide area network 250. Wireless network(s) 213 may further include, for example, a cellular network 220 (such as, for example, an LTE network), a wide area wireless network 230, and/or a local area wireless network 240. For ease of explanation, only one mobile device 210 is illustrated in network environment 200. However, as noted above, SDU 110 may interface with more than one mobile device. Moreover, it should be understood that a large number of other mobile devices not in communication with SDU 110 and/or other network entities may be communicatively coupled to network 213.

In an embodiment, SDU 110 may communicate with mobile device 210 over a wireless channel 212. The wireless channel 212 may use a variety of different wireless protocols associated with personal area networks and/or local area networks. For example, the embodiment shown in FIG. 2 may utilize a personal area network which may not require an independent networking infrastructure (e.g., cellular network 220, wide area wireless network 230, and/or local area wireless network 240) to communicate. SDU 110 may wirelessly communicate over wireless channel 212 that may be based on standards associated with ad hoc local area network(s) and/or personal area network(s). For example, SDU 110 may communicate with mobile device 210 using Bluetooth LE 4.0 transmit data and/or receive data over wireless channel 212. For communications to occur over an ad hoc network associated with wireless channel 212, a "pairing" between SDU 110 and mobile device 210 may first be established by initially negotiating a type of network, network parameters, and/or authentication credentials between SDU 110 and mobile device 210. The pairing may be established by the user manually, or in some embodiments, the pairing may be assisted using Near Field Communication (NFC) hardware and software which may be integrated into SDU 110 and/or mobile device 210, as described in more detail in relation to FIG. 3. Once paired, SDU 110 and mobile device 210 may automatically activate wireless connection 212 based on, for example, physical proximity, without intervention by the user.

The establishment, pairing, and/or data exchange between SDU 110 and mobile device 210 may be facilitated and/or controlled by the user through a companion application installed on mobile device 210. The companion application may operate in conjunction with an operating system and/or appropriate application programming interface(s) (APIs) installed on mobile device 210. For example, in an embodiment, after the SDU 110 and mobile device 210 are paired, a user may designate on mobile device 210 what type of information to provide to SDU 110 for display. The companion application may provide "share contracts" into the operating system of mobile device 210. For example, on mobile device 210, the user may navigate using a web page interface or view static content such as photos, documents, etc., and "share" the desired information with SDU 110 by, for example, clicking by interacting (e.g., touching, clicking, sliding, etc.) an appropriate graphical user interface control on mobile device 210, and indicating the content selected or displayed on mobile device 210 be shared with SDU 110. Examples of appropriate graphical user interface controls to share content may include a "share sheet" on iOS and a "share button" on Android. Indicating the destination of the shared content may be performed by selecting SDU 110 from a list of devices (e.g., cloud storage, printers, etc.) for which content may be shared. Once the content is selected, the companion application may post a notification and push data corresponding to the content to SDU 110 over wireless channel 212 for display by SDU 110.

Data transmitted from mobile device 210 to SDU 110 may represent content to render to a screen on the display of SDU 110, which may displayed immediately and/or cached in display buffers so static content does not have to be transferred every time a pairing occurs. Other transmitted data may include, for example, notifications based on various communication channels associated with mobile device 210 (e.g., cellular calls, text messages, etc.), software updates for SDU 110, position information, etc. Data transmitted by SDU 110 to mobile device 210 may include inputs from touch sensitive display, such as, for example, user commands responding to cellular calls, text messages, etc.

In another embodiment, data may be exchanged between SDU 110 and an external network device (e.g., third party network device 270 and/or app/theme store network device 260) over network 215 with mobile device 210, and subsequently exchanged with SDU 110 over wireless channel 212. For example, content may be pushed to SDU 110 over network 215 from an external network device in the following manner. A user may buy content from a network device serving as a portal, such as, for example, app/theme store network device 260. The content may be selected by the user through an interface displayed on SDU 110 and/or an interface provided on mobile device 210. The content may be, for example, an e-book, a screen/wallpaper for the display of SDU 110, etc. Once the content is selected, the companion application on mobile device 210 contacts an external network device to obtain the selected content, wherein the network device provides the content to mobile device 210. Upon receiving the content, the companion application may post a notification, and subsequently provide the selected content to SDU 110 over wireless channel 212. Upon receiving the content, SDU 110 may update its display with the selected content.

Wireless channel 212 may be supported by any appropriate wireless standard for local area networks, personal area networks, and/or near field communication channels. For example, wireless channel 212 may be supported by wireless technology standards which may include, for example, Bluetooth, Bluetooth Low Energy, Zigbee, WiFi, etc. Additional wireless interfaces may be used, for example, to facilitate the interface of mobile device 210 with SDU 110. For example, a Near Field Communication (NFC) wireless channel 150 may be used to exchange information between SDU 110 and mobile device 210. An NFC wireless channel may be used to exchange credentials for verification, trigger processes on mobile device 210 and/or SDU 110, such as, for example, start an application automatically for exchanging data streams, and/or prompt the user for operational preferences.

In general, SDU 110 may include any type of communications interface(s), and thus communicate using one or more different networking channels, including both wireless and/or wired connections. Alternatively, SDU 110 may interface with mobile device 210 over non-networking interfaces, such as, for example, any type of Universal Serial Bus (USB) interface (e.g., lightning connector, micro USB, etc.), thunderbolt, etc.

Mobile device 210 may obtain access to wide area network 250 through wireless network(s) 213 over any type of known radio channel(s) or combinations thereof. For example, mobile device 210 may access cellular network 220 over wireless channel 225. Access over wireless channel 225 may be provided through a base station, eNodeB, etc., within cellular network 220. In various embodiments, cellular network 220, wide area wireless network 230, and/or local area wireless network 240 may also communicate with each other in addition to mobile device 210. Mobile device 210 may also access network 215 over wireless channel 235 through wide area wireless network 230. Wide area wireless network 230 may include any type wireless network covering larger areas, and may include a mesh network (e.g., IEEE 801.11s) and/or or a WiMAX IEEE 802.16. Mobile device 210 also may access network 215 over wireless channel 245 through local area wireless network 240, which may include WiFi (e.g., any IEEE 801.11x network, where x=a, b, c, g, and/or n) and/or any type of Bluetooth network. Moreover, in an embodiment, SDU 110 and mobile device 210 may exchange data thorough local area wireless network 240 instead of, or in addition to, the ad hoc network which supports wireless channel 212. The wireless network(s) 213 may exchange data with wide area network 250 which could include backhaul networks, backbone networks, and/or core networks. App/theme store network device 260 and/or third part network device 270 may interface with wide area network 250, and thus with mobile device 210 over one or more of the air interfaces 225, 235, 245 through wireless network(s) 213.

Mobile device 210 may generate data for transfer to SDU 110 over wireless channel 212 and/or other network devices over network 215. The data may be transferred over one or more wireless channels by initially being buffered in "batches" and transmitted in bursts to maximize wireless channel efficiencies as the conditions of the wireless channel change as the mobile device 210 moves. Alternatively, the data may be "streamed" in real time shortly after the generation by mobile device 210. Charges for network access may be subsidized by third party manufacturers and/or service providers or otherwise altered as determined by one or more third party network devices 270 as described below. For example, there may be a number of business relationships in which carriers (which may manage app/theme store network device 260) and/or third parties (which may manage network device 270), such as manufactures of wearable articles, SDUs 110, and/or other related services, may subsidize wireless access charges, software, and/or hardware costs associated with SDU 110 by creating a service associated with wearable platforms (i.e., wearable platform as a service). For example, SDU 110 and/or mobile device 210 may collect and/or provide information feedback metrics and/or analytics to a carrier and/or third parties, such as, for example, fashion designers, regarding networking activity (such as web sites visited), access trends, and/or e-commerce activity of SDU 110 users. The collected information may describe spending habits which could drive monetization efforts such as offers, advertising, and/or electronic coupons (described in more detail below in regard to FIG. 5D), licensing wearable platform as a service, and/or contextual services and enablers (e.g., location based services), themes, customization, etc. Tie-ins to carriers may provide reduced or free wireless access fees for transferring and/or storing data streams over, for example, cellular network 225.

Additionally, service providers and/or carriers may provide applications and/or themes from app/theme store network device 260, which may be provided to SDU 110 (e.g., through mobile device 210 over wireless channel 212). Additionally or alternatively, applications and/or themes from app/theme store network device 260 may be provided over network 215 directly to SDU 110. App/theme store network device 260 may also provide applications for use with mobile device 210 which may be used in concert with SDU 110, such as, for example, the companion application which may allow mobile device 210 to interact, control, and/or monitor activities and/or interactions with SDU 110. Wearable platform services may also provide applications and/or themes through app/theme store network device 260, which may provide various discounts and promotions for users of SDU 110. Such discounts/promotions may include free or discounted SDUs 110, free or discounted mobile device 210, software support (free apps), sponsored wireless access, etc.

Mobile device 210 may include any type of electronic device having communication capabilities, and thus communicate over network 215 and/or wireless channel 212 using a variety of different channels, including both wired and wireless connections. Mobile device 210 may include, for example, a cellular radiotelephone, a smart phone, a tablet, a mobile phone, any type of IP communications device, a Voice over Internet Protocol (VoIP) device, a laptop computer, a palmtop computer, a gaming device, a media player device, or a digital camera that includes communication capabilities (e.g., wireless communication mechanisms).

Wireless network(s) 213 may include one or more wireless networks of any type, such as, for example, a local area network (LAN), a wide area network (WAN), a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Wide area network 250 may be any type of wide area network connecting backhaul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

App/theme store network device 260 may include a computer, a server, or other computing device, which, in some embodiments, may include a processor, a communications interface, a memory, and/or a mass storage device functionally coupled and configured to receive data from a plurality of mobile devices 210 (or in some embodiments, directly from SDU 110) associated with wireless customer accounts, and provide app and/or themes for use on mobile device 210 and/or SDU 110. Third party network device 270 may include a computer, a server, or other computing device, which, in some embodiments, may include a processor, a communications interface, a memory, and/or a mass storage device functionally coupled and configured to interact with SDU 110 to obtain metrics and/or other information from SDU 110 regarding user behavior, and provide various services associated with the wearable platform, which may include providing shopping discounts, rewards points, e-coupons, navigation services, etc.

Figure 3:
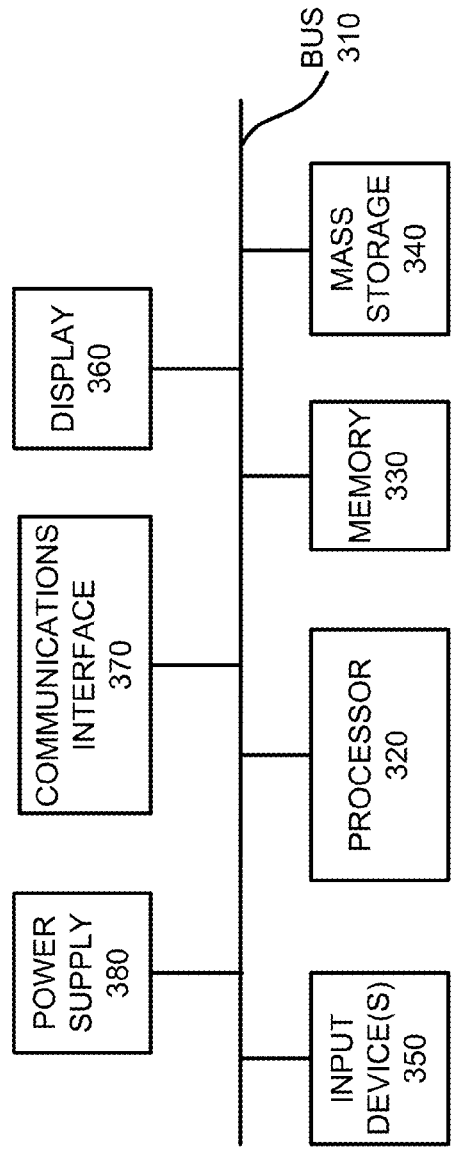
FIG. 3 is a block diagram of illustrating exemplary electrical components of the SDU consistent with an embodiment.

FIG. 3 is a block diagram of illustrating exemplary electrical components of SDU 110 consistent with an embodiment. SDU 110 may include a bus 310, a processor 320, a memory 330, mass storage 340, an input device 350, a display 360, a communications interface 370, and/or a power supply 380.

Bus 310 includes a path that permits communication among the components of SDU 110. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, processor 320 may be an x86 based CPU, and may use any operating system, which may include varieties of the Windows, UNIX, and/or Linux. Processor 320 may also use high-level analysis software packages and/or custom software written in any programming and/or scripting languages for interacting with other network entities are communicatively coupled to network environment 200.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read only memory (ROM) device or another type of static storage device, and/or a removable form of memory, such as a flash memory. Mass storage device 340 may include any type of on-board device suitable for storing large amounts of data, and may include one or more hard drives, solid state drives, or other configurations of non-volatile RAM. Memory 330 and/or mass storage 340 may store an operating system used by SDU 110, APIs, lower level software, and/or firmware. Mass storage and memory 330 may also be used to cache static content (e.g., images, contact data, etc.) received from mobile device 210 to reduce delays and/or power consumption of SDU 110, and/or bandwidth consumption and/or latency of wireless channel 212. Memory 330 and mass storage 340 may be suitable for storing files associated with data transferred by mobile device 210. For example, stored pictures, contacts, etc., transferred from mobile device 210 may be cached upon the establishment of wireless channel 212, and/or subsequent pairings with SDU 110.

Input device(s) 350 can allow a user to input information into SDU 110 for issuing commands and/or entering data for the SDU to execute, and/or provide commands and/or data to be transferred over wireless channel 212 to mobile device 210 and/or other network devices attached to network 215. Input device(s) 350 may typically include a touch screen interface integrated with display 360, wherein screens provided by display 360 may be interactive and thus respond to touch commands provided by a user. Additionally or alternatively, input devices 350 may include sensors such as a microphone, an image capturing device, and/or a video capturing device (e.g., CCD-based or CMOS-based image sensor), a colorimeter, etc. In an embodiment, the microphone may be used to provide voice commands to SDU 110. Additionally, other user interfaces may be used as optional input accessories to SDU 110, and may include a stylus/electronic pen, a wireless keyboard, a mouse, and/or trackpad. In an embodiment, optional input accessories may interface to SDU 110 over wireless channel 212 directly, and/or through mobile device 210. In an embodiment, a sensor (e.g., an imaging sensor and/or colorimeter) may be used to sense the surrounding texture, pattern and/or color of the material of a wearable article (e.g., handbag 100), and provide data so that processor 320 may adjust display 360 in a manner to blend in, or contrast with, the wearable article in a decorative fashion. The colorimeter may be used when SDU 110 is retrofitted (e.g., clipped on) to the wearable article not originally designed to incorporate the SDU. While not shown in FIG. 3, SDU 110 may further include output devices, such as a speaker and/or a phono jack for headphones, which may be used, for example, to provide audio output for voice calls (which may be made through mobile device 210), or to play music.

Display 360 may be any suitable device, e.g., having low power consumption requirements, and the ability to present content which may be efficiently discerned by a user in any lighting environment. Accordingly, display 360 presents screens having good contrast in rooms having low lighting conditions and out of doors in direct sunlight. Display 360 may utilize technologies associated with passive (reflective) displays and/or active displays. For example, display 360 may utilize a touch sensitive e-Ink display, which is a low voltage, static display technology. As used herein a static display may be defined as a display which does not have to be dynamically refreshed to retain displayed content, and maintains a persistent screen while drawing minimal power until visual content is updated. In other embodiments, display 360 may use a low power liquid crystal device (LCD), organic light emitting diode (OLED), or any appropriate display technology. Embodiments may also include displays made from flexible materials which may be incorporated into the designs of wearable articles as structural elements (e.g., side panel(s) of a handbag, a front and/or back of a shirt or jacket) and/or veneers for structural elements (e.g., coverings for side panel(s) of a handbag). The flexible display may be substituted in place of fabric, leather, etc., in at least a portion of a wearable item.

Communications interface 370 may include a transceiver(s) enabling SDU 110 to communicate over one or more channels with network environment 110. Communications interface 370 may include one or more wireless transceivers to establish and/or communicate over wireless channel 212 to exchange data with mobile device 210 and/or other network devices through network 215. Communications with other network devices (e.g., app/theme store network device 260, third party network device 270, etc.) may be performed over wireless channel 212 through mobile device 210 as an intermediary gateway to network 215, and/or directly over or through network 215. Accordingly, communications interface 370 may be configured for wireless communications (e.g., Bluetooth, Bluetooth LE, WiFi, analog RF, NFC, infrared, etc.), wired communications (e.g., conductive wire, twisted pair cable, fiber optic cable, etc.), or a combination of wireless and wired communications. Communications interface 370 may include a transmitter that converts baseband signals to RF signals and/or a receiver that converts RF signals to baseband signals. Communications interface 370 may be coupled to one or more antennas for transmitting and receiving RF signals. Communications interface 370 may include a logical component that includes input and/or output ports, input and/or output systems, and/or other input and output components that facilitate the transmission/reception of data to/from other devices. For example, communications interface 370 may include a network interface card (e.g., Ethernet card) for wired communications and/or a wireless network interface (e.g., a WiFi) card for wireless communications.

Communications interface may also include wired interfaces, such as, for example, USB, which may provide a communications channel between SDU 110 and mobile device 210, which may be used as a replacement for wireless channel 212, or as a supplemental connection, for example, when extra bandwidth may be required.

Communications interface 370 may include an NFC transceiver to assist in establish a pairing using another wireless technology. An NFC transceiver may be used to trigger an application which in turn can establish wireless channel 212. For example, through Bluetooth Secure Simple Pairing using NFC, the procedure to establish a Bluetooth based wireless channel 212 may be simplified. Usually Bluetooth uses an inquiry procedure to discover other Bluetooth enabled devices within a proximity. NFC can simplify the discovery process by eliminating the standard inquiry process by providing the Bluetooth address and other optional parameters related to a specific Bluetooth-enabled device. NFC thus removes the need for the user to select the appropriate device from a (potentially long) list. The result may be a more seamless wireless user experience. NFC can simplify the process of authenticated pairing between two Bluetooth devices by exchanging authentication information over an NFC link. NFC may also trigger the execution of a companion application to smoothly establish the paring. In an example, a user may touch mobile device 210 to SDU 110 to start the application and establish the pairing. After a pairing has been established, Bluetooth may automatically open wireless channel 212 when mobile device 210 is placed within a proximity of SDU 110.

Power supply 380 may include an on-board battery which may be integrated into the case housing of SDU 110. Power supply 380 may also include one or more interfaces to accept external power for charging the on-board battery and/or providing operating power to SDU 110. The interfaces associated with power supply 380 may include wired connections (e.g., USB) or wireless connections (e.g., inductive coupling) for accepting power. For example, SDU 110 may accept a wired connection from battery 115 which may be installed a wearable article, for example, in case 105 of handbag 100. Alternatively, the on-board battery (and/or battery 115) may be charged via a connection established by electrical connector 125 and cabling 130 concealed in mounting hardware buckle 140 and strap 120, respectively as shown in FIG. 1C.

As described below, SDU 110 may perform certain operations relating to exchanging data with mobile device 210 and/or other network devices for providing a display and other functionality for operation with a wearable article. SDU 110 may perform these operations in response to processor 320 executing software instructions contained in a computer-readable medium, such as memory 330 and/or mass storage 340. The software instructions may be read into memory 330 from another computer-readable medium or from another device. The software instructions contained in memory 330 and/or mass storage 340 may cause processor 320 to perform processes described herein. Alternatively, hardwired circuitry may be used in place of, or in combination with, software instructions to implement processes described herein. Thus, implementations described herein are not limited to any specific combination of hardware circuitry and software. Although FIG. 3 shows exemplary components of SDU 110, in other implementations, storage and retrieval system 110 may include fewer components, different components, additional components, or differently arranged components than depicted in FIG. 3.

Figure 4:
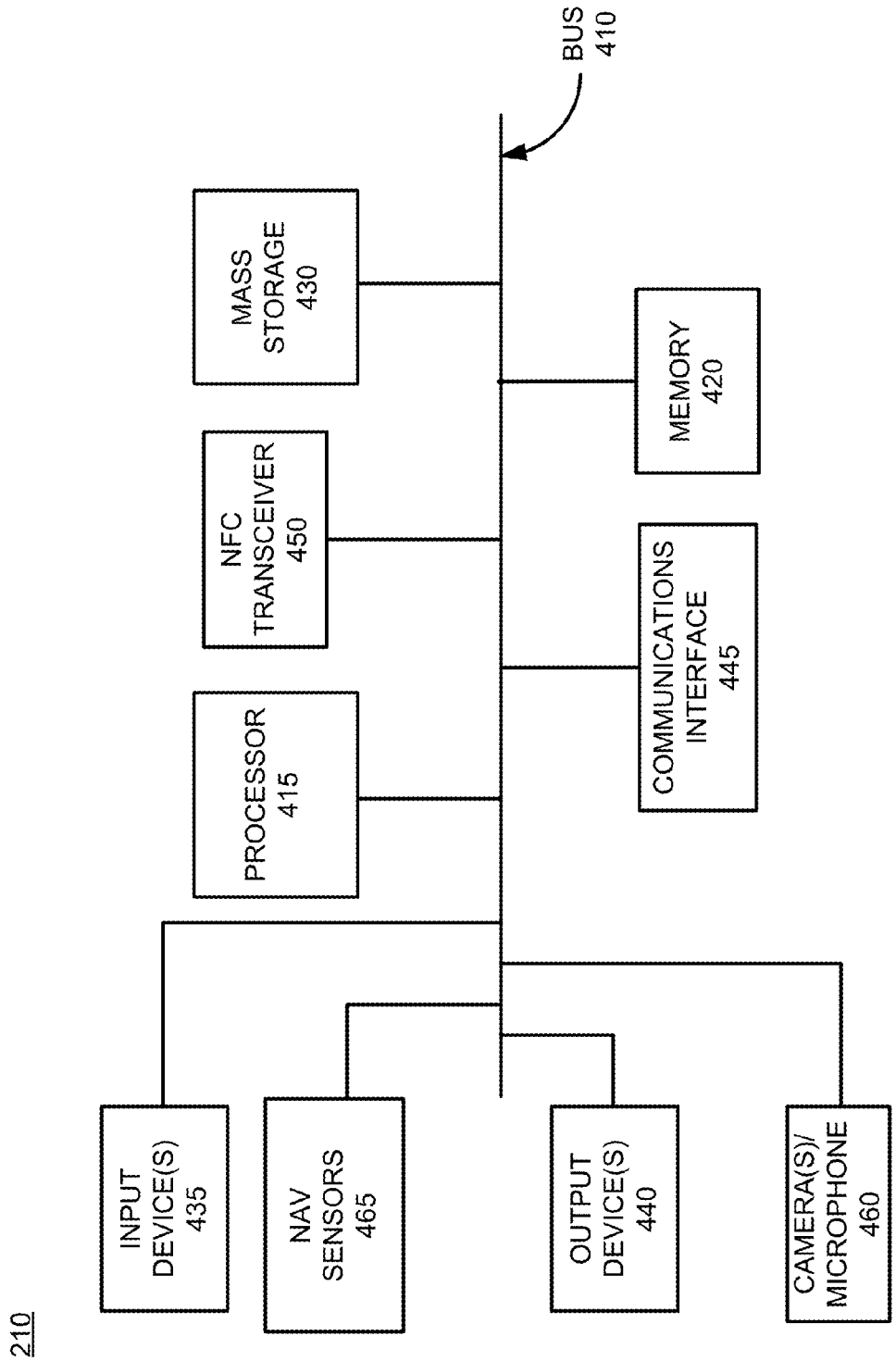
FIG. 4 is a block diagram depicting exemplary components of a mobile device.

FIG. 4 is a block diagram depicting exemplary components of a mobile device 210 according to an embodiment. Mobile device 210 may include a bus 410, a processor 415, memory 420, a mass storage device 430, one or more input device(s) 435, one or more output device(s) 440, a communications interface 445, a Near Field Communications (NFC) transceiver 450, one or more camera(s) and/or microphone 460, and navigation sensors 465. Bus 410 may include a path that permits communication among the elements of mobile device 210.

Processor 415 may include a processor, microprocessor, or processing logic that may interpret and execute instructions. Memory 420 may include a random access memory (RAM) or another type of dynamic storage device that may store information and instructions for execution by processor 615. Memory 420 may also include a read only memory (ROM) device or another type of static storage device that may store static information and instructions for use by processor 415. Mass storage device 430 may include a solid state and/or magnetic media for storage.

Input device(s) 435 may include one or more mechanisms that permit an operator to input information to mobile device 210, such as, for example, a keypad or a keyboard, a microphone, voice recognition, components for a touchscreen, and/or biometric mechanisms, etc. Output device(s) 440 may include one or more mechanisms that output information to the operator, including a display, a speaker, etc.

Communications interface 445 may include any wireless or wired transceiver mechanism(s) that enables mobile device 210 to communicate with SDU 110 and/or other network devices on network 215. Communications interface 445 may support wireless channel 212 using any appropriate wireless standard for local area networks, personal area networks, and/or near field communication channels. For example, wireless channel 212 may be supported by wireless technology standards which may include, for example, Bluetooth, Bluetooth Low Energy, Zigbee, WiFi, etc. Communications interface 445 may also support communications with wireless network 212 over one or more wireless commination channels 225, 235, 245 over cellular network 220, wide area wireless network 230, and/or local area wireless network 240.

For example, communications interface 445 may support one or more wireless networks of any type, such as, for example, a local area network (LAN), a wide area network (WAN), a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein. Communications interface 445 may also support wide area wireless network 230 and may include any type of wireless network covering larger areas, may include a mesh network (e.g., IEEE 801.11s), and/or or a WiMAX IEEE 802.16. Mobile device 210 also may access network 215 over wireless channel 245 through local area wireless network 240, which may include WiFi (e.g., any IEEE 801.11x network, where x=a, b, c, g, and/or n).

NFC transceiver 450 may be used to receive an initiation signal to initiate a protocol for establishing wireless channel 212 as described above. Navigation sensors 465 may include a global positioning system (GPS) or any satellite navigation system receiver to determine a position of mobile device 210.

Camera(s)/microphone sensor 460 may include one or more cameras (e.g., a front facing camera and/or a rear facing camera) to record image and/or video data. One or more microphones may be included to further record audio.

Mobile device 210 may perform certain operations or processes, as may be described herein to operate, interact, and exchange data with SDU 110. Mobile device 210 may perform these operations in response to processor 415 executing software instructions contained in a computer-readable medium, such as memory 420 and/or mass storage device 430. A computer-readable medium may be defined as a physical or logical memory device. A logical memory device may include memory space within a single physical memory device or spread across multiple physical memory devices. The software instructions may be read into memory 420 from another computer-readable medium, such as storage device 430, or from another device via communications interface 445. The software instructions contained in memory 420 may cause processor 415 to perform operations or processes supporting SDU 110 operations which are described in detail with respect to FIG. 7. Alternatively, hardwired circuitry may be used in place of or in combination with software instructions to implement processes consistent with the principles of the embodiments. Thus, exemplary implementations are not limited to any specific combination of hardware circuitry and software.

The configuration of components of mobile device 210 illustrated in FIG. 4 is for illustrative purposes only. It should be understood that other configurations may be implemented. Therefore, mobile device 210 may include additional, fewer and/or different components than those depicted in FIG. 4.

FIGS. 5A-5E illustrate exemplary graphical user interfaces which may be displayed on SDU 110 in various embodiments. Various screens may be presented on display 360 of SDU 110 to provide content which is interpretable using only a glance, thus possessing the quality of "glanceability." Glanceability may refer to how quickly and easily a visual design conveys information after the user is looking at or paying attention to a display. Glanceability may be affected by the amount and type of information being displayed. Interpreting a display of fewer items of information will be much easier than interpreting a display of many items of information. Glanceability may also be affected by design elements such as color, shape, position, size, and contrast, which may be used to represent information in a variety of ways. Accordingly, content may be formatted and displayed on SDU 110 so that it may be quickly and easily understood by only requiring a minimal amount of attention by the user. Moreover, the screen provided on display 360 may present content which also serves as graphical control elements, which may accept touch inputs from the user via a touch screen, and provide interactivity with SDU 110. Additionally, the background of a screen provided on display 360 of SDU 110 may be determined by an input device(s) 350 (a sensor such as a camera and/or colorimeter) as to a color, texture, and/or pattern to match handbag 100. Alternatively, different themes may also be customized, based on user content (e.g., personal photographs) and/or specific content purchased through app/theme store 260, to personalize SDU 110 according to the preferences of the user. For example, choices colors, patterns, and/or textures, which may have been developed and matched to a specific wearable article (e.g., handbag 100) by a creative professional, may be presented to a user within app/theme store 260 for purchase and download to further accessorize and/or customize SDU 110 according to the preferences of a user.

Figure 5A:
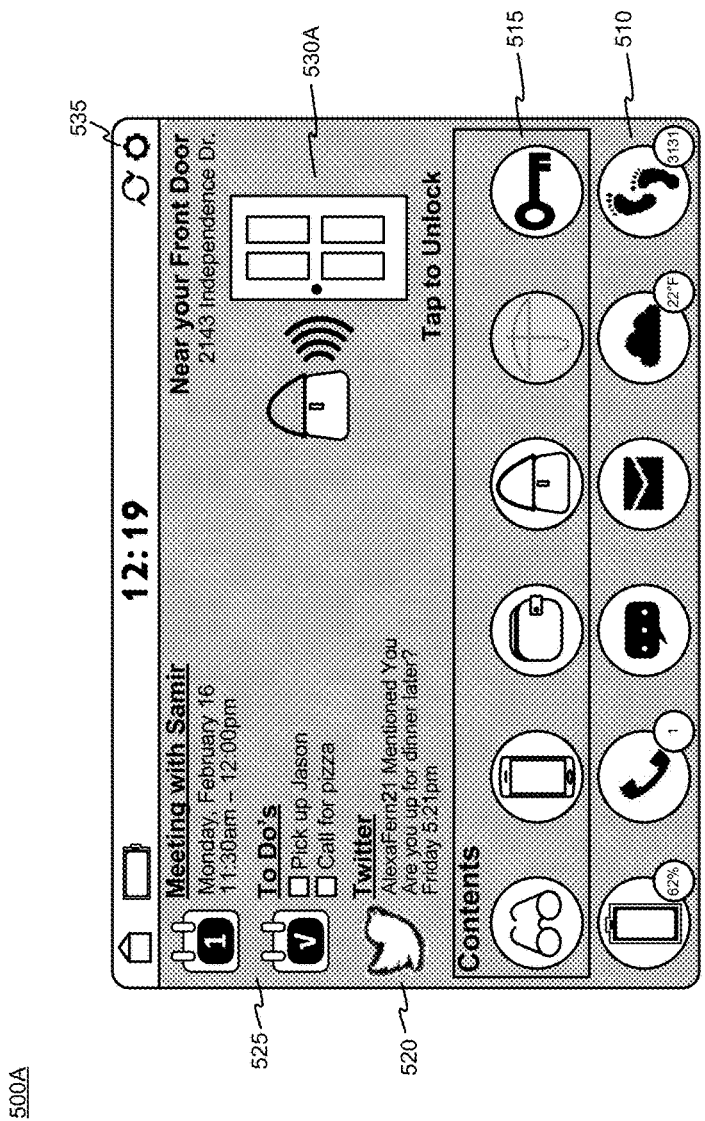
FIGS. 5A-5D illustrate exemplary graphical user interfaces which may be presented on the SDU in various embodiments.

FIG. 5A shows an embodiment of a screen 500A which may be organized into a number of different areas based on type of information which may be provided to the user, and/or the types of commands which may be received from the user. For example, screen 500A may present a notification area 510, a contents area 515, a social networking area 520, a productivity area 525, and/or a contextual area 530 (in FIG. 5A, showing a screen area 530A which provides an unlocking functionality).

Notification area 510 may present notifications and other information associated with mobile device 210. Different types of information may be presented as individual icons, which may be selected and/or arranged by the user through a customization process. The customization process may be initiated directly on SDU 110, for example, by entering a setup screen which may be accessed using graphical control 535 on touch screen display 360. Alternatively or additionally, the customization process may be initiated through the companion application on mobile device 210, and transferred to SDU 110 over wireless channel 212. The icons in notification area 510 may be arranged in a group as shown, and may include, for example, icons associated with (as described from left to right): a battery level of mobile device 210, a number of unanswered calls to mobile device 210, a number of new text messages to mobile device 210, a number of new emails to mobile device 210, weather information being reported to mobile device 210, and/or a number of steps reported by a pedometer within mobile device 210. The icons may display supplemental text and/or numerical information providing the user of additional status regarding that particular icon. For example, battery level icon may provide a remaining level of charge (e.g., as percentage or in terms of remaining operating time), weather icon may display, for example, the temperature, etc. The supplemental information displayed may also be customized by the user. Additional information associated with an icon may be imparted based on the appearance of an icon, such as, for example, color, gray-scale level, transparency, animation, size, shape, etc., which may signal the user of important information (e.g., the charge level of battery of mobile device 210 is almost empty). Other icons may be selected by the user which are not shown, and may include calorie counters, health monitors, etc. Moreover, each icon may further serve as a graphical control, and may present new screen presenting additional information and/or provide additional functionality associated with an icon upon being activated by the user.

Contents area 515 may provide inventory information associated with the status of the presence of contents within handbag 100, which may be dynamically tracked by SDU 110 upon being added and/or removed by the user. Information provided by contents area 515 allows a user to conveniently determine which items are present in handbag 100 through a quick glance of display 360 on SDU 110, without having to open handbag 100 to physically examine the contents thereof. An icon in contents area 515 may indicate the presence of a particular item in case 105 based on the appearance of the icon representing the particular item, wherein the signaling appearance may include changes or variations in color, gray-scale level, transparency, animation, size, shape, etc. Different content items may be presented as individual icons, wherein each icon may be selected and/or arranged by the user through another customization process. Similar to the process described above relating to notification area 510, the customization process for contents area 515 may be initiated directly on SDU 110, for example, by entering a setup screen which may be accessed using graphical control 535 on touch screen display 360. Alternatively or additionally, the customization process may be initiated through the companion application on mobile device 210, and transferred to SDU 110 over wireless channel 212.

The icons in contents area 515 may be arranged in a group as shown in FIG. 5A, and may include, for example, icons associated with (as described from left to right): prescription glasses and/or sunglasses; mobile device 210, a wallet, a smaller handbag or other container (e.g., clutch 150), an umbrella, and/or key(s). In the example shown in FIG. 5A, the icon associated with an umbrella is "grayed out" or appears dimmer than the other icons, which may signal that the umbrella is not present in handbag 100. Moreover, each icon may further serve as a graphical control, and may present new screen presenting additional information and/or provide additional functionality associated with an icon upon being activated by the user. For example, activating the mobile device 210 icon may initiate a process wherein SDU 110 helps a user determine the location of mobile device 210 by displaying it on a map, and/or commanding mobile device to emit a sound which may be heard within a proximity of SDU 110. Similar routines may be performed for finding other types of items tracked by SDU 110 depending upon how the items are tracked, which will be described in more detail below.

In an embodiment, items may be tracked, for example, using a wireless NFC transceiver in communications interface 370 which detects and identifies radio frequency identification (RFID) tags associated with tracked items. During a setup operation, a user may attach an RFID tag to each of the items the user wishes to track, and establish an association between each tracked item and its corresponding RFID tag. The setup operation may store and associate unique information identifying each RFID tag, and by association, the item to which the RFID tag is attached. The associations may be established using the companion application on mobile device 210 and communicated to SDU 110 over wireless channel 212. Additionally or alternatively, the associations may be established through a setup routine running on processor 320 on SDU 110. The setup routine may be accessed by the user using graphical control 535. Once the associations are established and stored within SDU memory 330 and/or mass storage 340, SDU may track the presence of each item by detecting and identifying each RFID tag associated during the setup process.

In an embodiment, the RFID tags may also be used to assist a user in finding an item which is indicated as not being present in contents area 515. For example, the signal used by the RFID tag itself, or in association with additional communication hardware (e.g., providing other networking capabilities such as WiFi and/or Bluetooth) may help a user determine the location of the tracked item when it is misplaced. Additionally, other signaling hardware (e.g., components to generate an audible and/or visual signal or alarm) may be activated to guide the user to the misplaced item if it is within a proximity of the SDU 110. A routine for finding an item may be activated upon the user noticing the item is missing from handbag 100, based, for example, on the appearance of its associated icon in contents area 515 (e.g., the umbrella as shown in FIG. 5A). The user may activate the icon associated with the missing item, which may initiate a routine on SDU 110 and/or the mobile device 210 to determine the location of the misplaced item and display the location on a map, and/or commanding the hardware associated with the tag to emit a sound which may be heard within a proximity of SDU 110, or visual signal such as a flashing LED.

In another embodiment, the companion application running on mobile device 210 may also be used to track SDU 110, so the user may easily find a lost or stolen handbag 100, or an SDU 110 which was removed from handbag 100 and misplaced by the user. For example, the user may activate an option in the companion application to help a user determine the location of SDU 110 by displaying the location on a map, and/or commanding SDU 110 to emit a sound (or flash its display 360 and/or another LED indicator) which may be heard within a proximity of mobile device 210. In other embodiments, the ability to determine inventory information and/or generate a user interface to provide inventory information may be extended to other types of devices besides SDU 110, and/or extended to other contexts besides tracking items within handbag 100. For example, items (e.g., cards, keys, etc.) may be tracked in proximity to a person (e.g., carried in clothing, wallets, etc.) based upon a display shown on a mobile device, or other display (e.g., wearable headset). Alternatively, in another example, items may be tracked within a predetermined area (e.g., desks, closets, automobiles, etc.) and inventory information may be displayed on a mobile device or other display.

Further referring to FIG. 5A, SDU 110 may present social networking area 520 which may provide information feeds and/or alerts from one or more social networking services and/or news feeds of interest to the user of SDU 110. The user may have content (e.g., text and/or graphics), which may originate from a social networking service such as, for example, Twitter, Facebook, etc., formatted for presentation on social networking area 520 of display 360. In an embodiment, the content from the social networking service(s) may be provided through mobile device 210 over wireless channel 212. The social networking service(s) may be selected by the user through the companion application running on mobile device 210, and/or may be selected during a setup procedure on SDU 110, for example, by entering a setup screen which may be accessed using graphical control 535 on touch screen display 360.

SDU 110 may also present a productivity area 525 on screen 500A which may integrate with various productivity applications on mobile device 210, which may include calendaring applications, task list (to do list) applications, notepad applications, etc. Information from the productivity applications on mobile device 210 may be provided over wireless channel 212 to SDU 110. Additionally, commands may be provided by the user through touch-screen display 360 to interact with the content provided by one or more productivity applications. The input received at touch screen 360 may be provided back to mobile device 210 over wireless channel 212 to update the information for the appropriate productivity application running on mobile device 210. The type of application may be designated on the screen of SDU 110 by a graphic for easy recognition by the user, along with text blocks providing information. For example, productivity area 525 may present a calendar graphic along with an appropriately formatted text block to present upcoming appointments to the user. Task list applications may provide an appropriate graphic along with a list of task items. Each task item may be associated with a checkbox so the user may easily check off completed items through the touch screen display 360. Once a task item is checked off using touch screen display 360, SDU 110 may update the appropriate application on mobile device 210 over wireless channel 212.

Further referring to FIG. 5A, SDU 110 may include a contextual area 530 which provides content that may depend on various contexts which may be determined either by SDU 110 and/or mobile device 210. SDU 110 may use an algorithm running on processor 320, utilizing instructions stored in memory 330, to determine what screen to display in contextual area 530 based on a variety of contexts. The contextual area 530 may be based, either in whole or in part, on any sensed and/or received information, which may include, for example, position, direction, orientation, proximity to device(s), time, date, detection of wireless signals (e.g., signals from RFID devices, terminals, LANs, WANs, cellular networks, etc.), velocity, acceleration, etc. For example, as shown in FIG. 5A, contextual area 530A facilitates a door unlocking functionality wherein SDU 110 may sense the context of a location and/or sensing a signal associated with a locking mechanism of the door. The signal may be received by communications interface 370, and may be based on, for example, RFID/NFC, Bluetooth, WiFi, etc. The position may be provide by mobile device 210 over wireless channel 212. Upon approaching a predetermined location such as, for example, a user's home or work address, and/or detecting a signal provided by a particular locking mechanism which is associated with the predetermined location, contextual area 530 may provide a user interface indicating a graphic and/or text associated with the predetermined location (e.g., showing a door along with a label such as "Front Door" and/or the address of the predetermined location). The contextual area 530 may further present instructions for unlocking a door, and sense an action provided by the user in accordance with the instructions. For example, the user may provide an instruction through an action on the touchscreen display 360, such as a "tap," to unlock the door. Upon receiving the user instruction, SDU 110 may provide a signal through communications interface 370 which unlocks the door directly, or provides instructions to mobile device over wireless channel 212 for the mobile device 210 to provide the appropriate signal to unlock the door per the user's instructions.

Figure 5B:
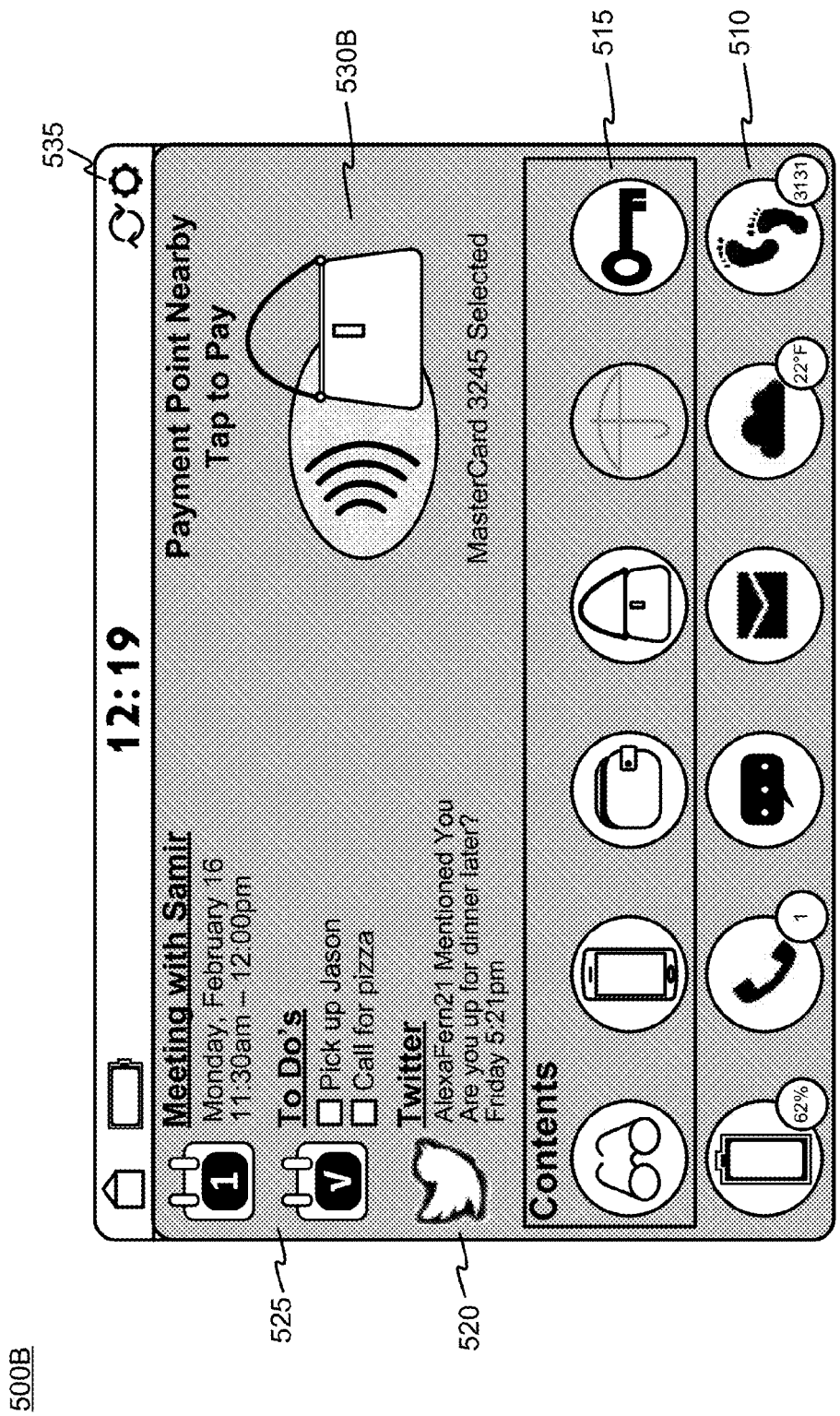

FIG. 5B shows an embodiment of a screen 500B having a contextual area 530B configured to facilitate payment for goods or services. When in proximity of an appropriately configured payment terminal, SDU 110 may detect a signal associated therewith. The signal may be in accordance with any electronic payment standard, and be associated with wireless standards based on an NFC signal, a Bluetooth signal, a WiFi signal, etc. Upon detecting the signal, SDU 110 may update contextual display 530B and prompt the user to provide an action to effectuate a payment (e.g., request the user to tap touch screen display 360). Upon receiving the user action, the SDU 110 may provide instructions to have mobile device 210 perform the actual payment operation over network 215 in a secure manner. The payment may be based on a default credit card (which may be identified to the user on display 360), wherein the default credit card may be changed, or another credit card may be selected, through a setup screen which may be accessed on display 360 through graphic control 535. In another embodiment, SDU 110 may perform the payment operation without the assistance of mobile device 210 over a network through communications interface 370. In other embodiments, contextual area 530B may further trigger off the geographical location in addition to a signal received by a payment terminal, and may be used to pay for a variety of goods and services, such as, for example, tickets for movies, concerts, shows, sporting events, meals and/or drinks in restaurants, etc.

Figure 5C:
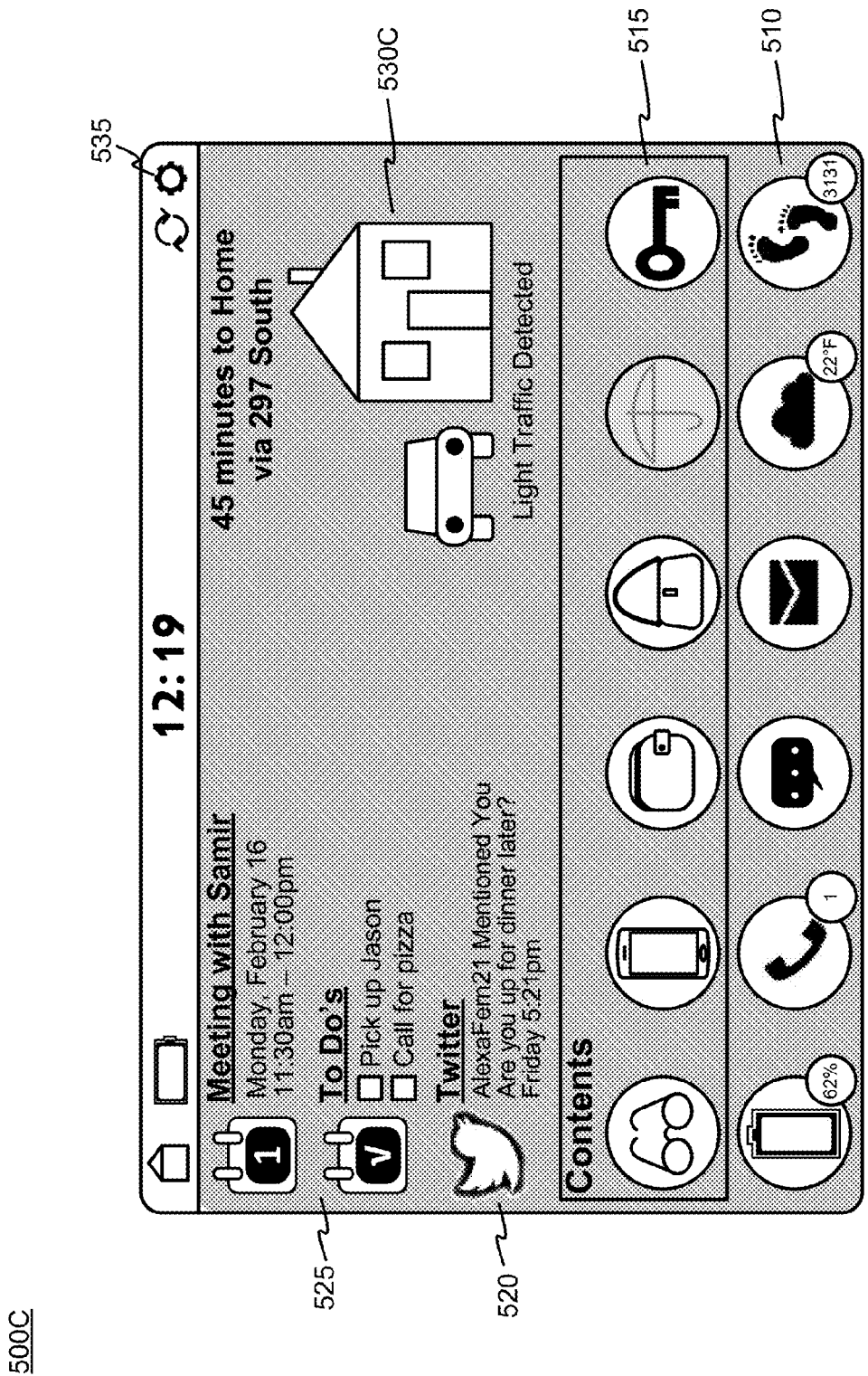

FIG. 5C shows an embodiment of a screen 500C having a contextual area 530C which may provide commuting, weather, and/or news information based on location, date, and time of day. For example, SDU 110 may determine that it is a weekday evening and the present location is the work address of the user. In response, SDU 110 may provide commuting information in contextual display 530C using the user's home as a destination. The commuting information may be determined based on saved locations for indicating work and home coordinates stored in mobile device 210, and may be generated by applications running on mobile device 210. Once generated, the commuting information may be provided to SDU 110 over wireless channel 212, and may include traffic information and an estimated time of arrival, over an optimal or preferred route to the destination, taking into account the traffic information along the selected route.

Figure 5D:
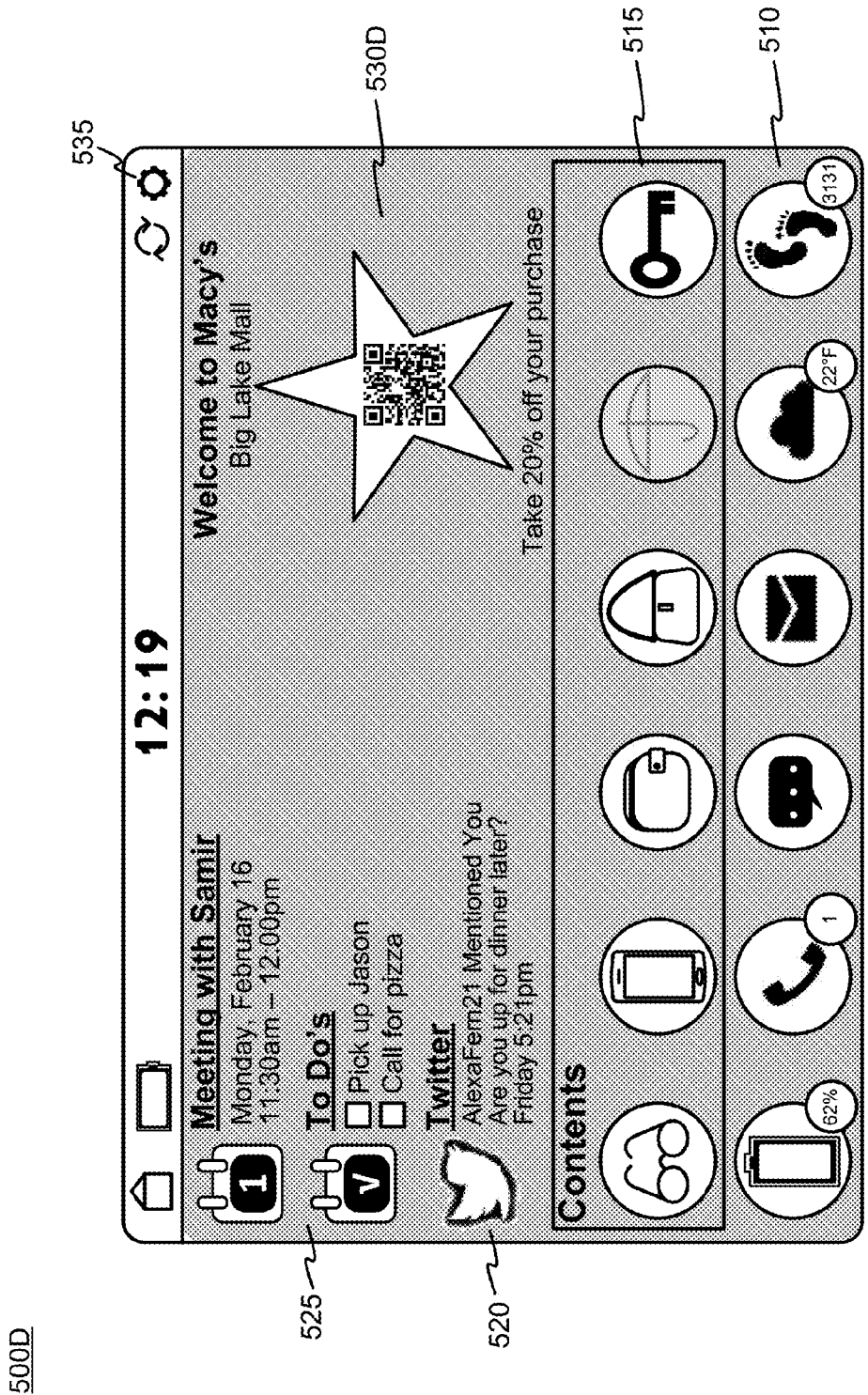

FIG. 5D shows an embodiment of a screen 500D having a contextual area 530D which may provide e-commerce information to a user based on a determined location of SDU 110 and/or the shopping history of the user. For example, contextual area 530 may display electronic coupons, in the form of digital codes, such as, for example, quick response (QR) codes, which may be used at a point of sale to receive a discount on purchases. The QR code may be immediately used to receive a discount by having a point of sale terminal scan the QR code presented in contextual area 530D on display 360. Contextual display may further provide a logo associated with a store and its location, along with a summary indicating the value of the e-coupon.

Figure 6:
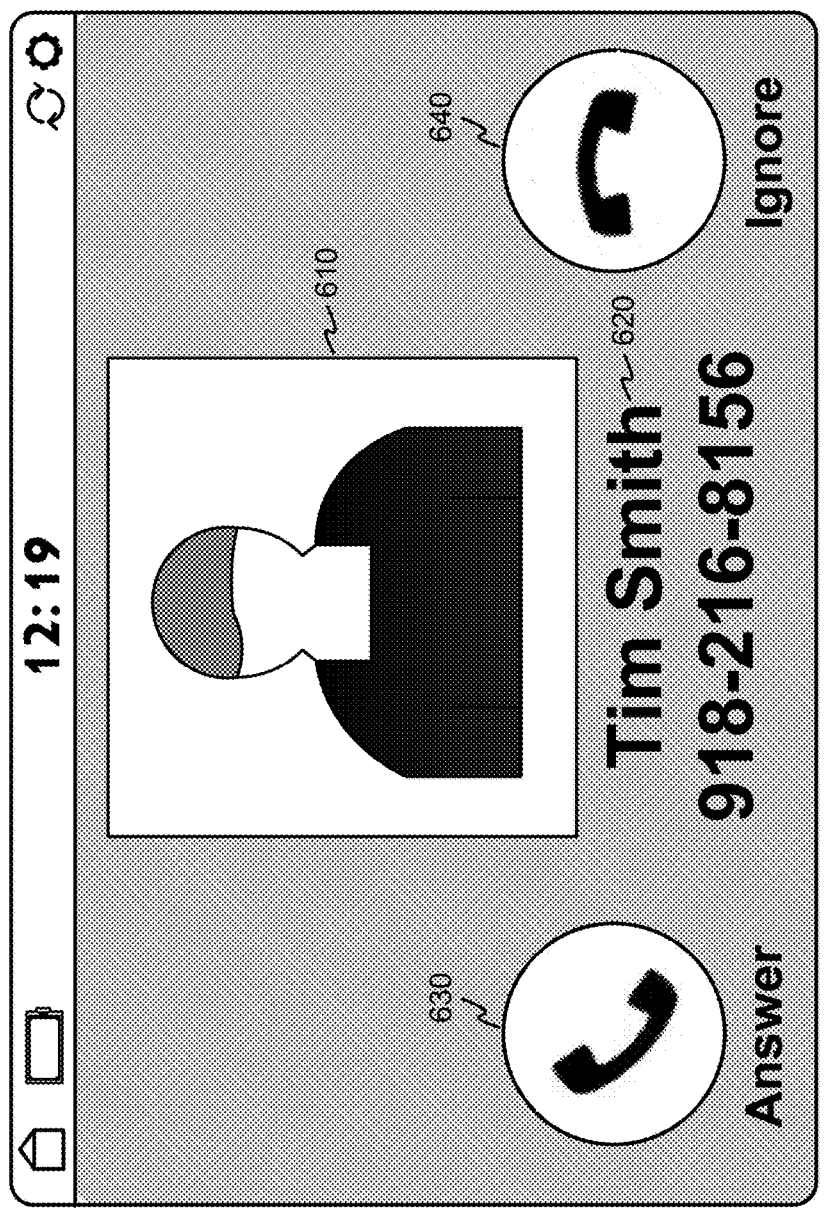
FIG. 6 shows an exemplary graphical user interface which may be presented on the SDU when a call is received on the mobile device.

FIG. 6 shows an embodiment having a screen 600 which may be presented when a call is received on mobile device 210. When mobile device 210 is paired with SDU 110, the user may designate mobile device 210 to use SDU 110 as a user interface during a call in a manner similar to "hands-free" devices used in automobiles. Alternatively, if mobile device is paired with SDU 110, mobile device 210 may automatically use SDU 110 as the user interface. Upon receiving the incoming call notification from mobile device 210, SDU 110 may present screen 600 showing information regarding the caller, which may include an image of the caller 610 and/or text 620 indicating the name of the caller, if the caller's information is stored in the contacts database. The image and other caller information stored in contacts may be cached by SDU 110 and stored in memory 330 or mass storage 340 so this information is not transferred over wireless channel 212 every time a call is received from a known contact. The user may use screen 600 to answer an incoming call on mobile device 210 by selecting an "answer" graphic control 630. When answer graphic control 630 is selected, the user may communicate with the caller using a microphone and speaker built into SDU 110, or a headset (e.g., Bluetooth) which may communicate directly with mobile device 210 or through SDU 110. By using the graphical controls 630, 640 to direct the incoming call (i.e., answer or ignore, respectively), the user may conveniently address the call without having to remove mobile device 210 from handbag 100.

Figure 7:
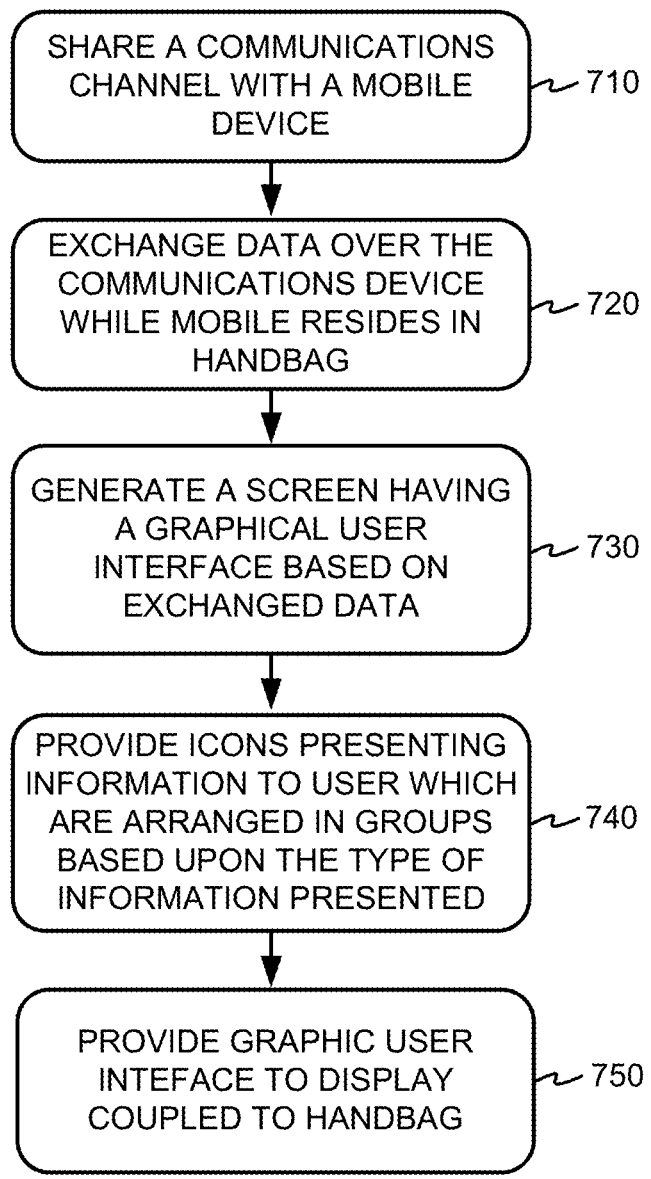
FIG. 7 is a flow chart showing an exemplary process associated with the SDU consistent with an embodiment.

FIG. 7 is a flow chart showing an exemplary process 700 associated with operation of SDU 110. In an embodiment, at least one processor 320, in association with instructions stored in memory 330 and/or mass storage 340, may perform actions associated with process 700. Other embodiments may utilize processor(s) which are hardware based (e.g., ASICs) instead of, or in addition to, a processor which executes software instructions.

SDU 110 may initially share a communications channel with mobile device 210 (Block 710). The communications channel may be wireless channel 212, a wired connection (e.g. USB) with mobile device 210, or a combination thereof. In an embodiment, sharing the communications channel may include SDU 110 wirelessly receiving an initiation signal from mobile device 210, and opening a wireless communications channel with mobile device 210 in response to the initiation signal, when mobile device 210 is placed within a proximity of handbag 100. In an embodiment, when SDU 110 wirelessly receives the initiation signal, SDU may further receive networking information from the initiation signal from a Near Field Communications (NFC) transceiver in communications interface 370. SDU 110 may further establish the wireless communications channel based on the received networking information. SDU 110 may exchange data over the communications channel while mobile device 210 resides within the handbag (Block 720).

SDU 110 may then generate a screen having graphical user interface (GUI) based on the exchanged data (Block 730). The appearance of the screen may be based on a measurement of a wearable article (e.g., handbag 100). For example, a measurement may be performed by a sensor (e.g., an imaging sensor and/or colorimeter) which may measure a color, a texture, and/or a pattern of the exterior of the wearable article. For example, the sensor may be able to measure a color and a pattern of the leather exterior of handbag 100. SDU 110 may convert these measurement into colors, texture tile, and/or patterns to configure the appearance of display 360. Additionally, the GUI may also be generated based on data received directly by SDU 110 over network 215 from other network device(s), such as, for example, app/theme store network device 260 and/or third part network device 270, etc. In an embodiment, the graphical user interface may be formatted for "glanceability." That is, information on the GUI can be interpreted based on a glance by a user. In an embodiment, SDU 110 may provide information residing on mobile device 210 relating to calendar events, task list items (e.g., productivity area 525, FIG. 5A), and/or content received from social networking services (e.g., area 520, FIG. 5A).

In an embodiment, SDU 110 may generate the GUI by providing text and/or graphics relating to information which changes dynamically upon one or more contexts associated with handbag 100. A context may include a location of the wearable article, a time, a date, and/or a presence of a payment terminal within a proximity of the wearable article.

In another embodiment, SDU 110 may provide, in response to an incoming call received by mobile device 210, an identity, a phone number, and/or an image representing an identity of the source of the incoming call, as illustrated in FIG. 6. SDU 110 may further provide icons acting as graphical controls which may accept user input to select an action responding to the call. One action may include accepting the call (e.g., graphical control icon 630, FIG. 6). Another action may include ignoring the call and/or sending the call to voicemail (e.g., graphical control icon 640, FIG. 6).

SDU 110 may provide icons presenting information to the user, where the icons may be arranged in groups based upon the type of information each icon presents (Block 740). In an embodiment, SDU 110 may arrange a first plurality of icons into a first group in notification area 510. Each icon in the first group may present an information item relating to mobile device 210. Additionally, an information item may include a battery level of mobile device 210, a number of unanswered calls to mobile device 210, a number of new text messages to mobile device 210, a number of new emails to mobile device 210, weather information being reported to mobile device 210, and/or a number of steps reported by a pedometer within mobile device 210.

In another embodiment, SDU 110 may arrange a second plurality of icons into a second group in contents area 515. Each icon in the second group may present a status of the presence of at least one physical item contained within handbag 100. The physical item contained within the handbag may include a pair of glasses, mobile device 210, a wallet, a smaller handbag, an umbrella, or one or more keys. In an embodiment, SDU 110 may provide an interface to determine a location of mobile device 210 when mobile device 210 is not present within handbag 100.

SDU 110 may provide the GUI to the display 360, where display 360 may be coupled to handbag 100 (Block 750). In an embodiment, display 360 may be a touch sensitive display, and SDU 110 may further detect a touch input on touch sensitive display 360 at a location(s) corresponding to a graphical control elements(s) selected by the user. SDU 110 may further perform an action in response to the detected touch input, where the action may be based on the selected graphical control element(s).

The foregoing description of implementations provides illustration and description, but is not intended to be exhaustive or to limit the invention to the precise form disclosed. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with regard to FIG. 7, the order of the blocks may be modified in other embodiments. Further, non-dependent processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method for providing information to a display associated with a wearable article, comprising:
   sharing a communications channel with a mobile device;
   exchanging data with the mobile device over the communications channel;
   generating a screen based on the exchanged data having a graphical user interface (GUI), wherein an appearance of the screen is based on a measurement of the wearable article;
   providing icons on the GUI presenting information to a user, wherein the icons are arranged in groups based upon a type of information that each icon presents;
   arranging a first plurality of icons into a first group, wherein each icon in the first group presents a status of a presence of a physical item contained within the wearable article, wherein the physical item contained within the wearable article comprises at least one of a pair of glasses, the mobile device, a wallet, a handbag, an umbrella, or one or more keys;
   providing an interface to determine a location of the mobile device when the mobile device is not present within the wearable article; and
   providing the GUI to the display, wherein the display is coupled to the wearable article.

2. The method according to claim 1, wherein sharing a communications channel comprises:
   wirelessly receiving an initiation signal from the mobile device; and
   opening a wireless communications channel with the mobile device in response to the initiation signal when the mobile device is placed within a proximity of the wearable article.

3. The method according to claim 2, wherein wirelessly receiving an initiation signal further comprises:
   receiving networking information from the initiation signal from a Near Field Communications (NFC) transceiver; and
   establishing the wireless communications channel based on the received networking information.

4. The method according to claim 1, wherein providing icons on the GUI presenting information to the user further comprises:
   arranging a second plurality of icons into a second group, wherein each icon in the second group presents an information item relating to the mobile device, wherein an information item comprises at least one of a battery level of the mobile device, a number of unanswered calls to the mobile device, a number of new text messages to the mobile device, a number of new emails to the mobile device, weather information being reported to the mobile device, or a number of steps reported by a pedometer within the mobile device.

5. The method according to claim 1, wherein generating a screen having a graphical user interface comprises:
   providing information stored on the mobile device relating to at least one of calendar events, task list items, or content received from social networking services.

6. The method according to claim 1, wherein generating a screen having a graphical user interface comprises:
   providing at least one of text or graphics relating to information which changes dynamically upon at least one context associated with the wearable article, wherein the at least one context comprises at least one of a location of the wearable article, a time, a date, or a presence of a payment terminal within a proximity of the wearable article.

7. The method according to claim 1, wherein generating a screen having a graphical user interface comprises:
   providing, in response to an incoming call received by the mobile device, at least one of an identity, a phone number, or an image representing an identity of a source of the incoming call, and icons which accept user input to select an action responding to the call.

8. The method according to claim 1, wherein generating a screen having a graphical user interface comprises:
determining a measurement of the wearable article including at least one of a color, a texture, or a pattern;
detecting a touch input on a touch sensitive display at location corresponding to a graphical control element selected by the user; and
performing an action in response to the detected touch input, wherein the action is based on the selected graphical control element.

9. A wearable article, comprising:
a wireless transceiver;
a display coupled to an exterior of the wearable article;
a sensor configured to measure an appearance of the exterior of the wearable article;
a memory to store instructions; and
a processor, coupled to the sensor, the memory, the wireless transceiver, and the display, the processor being configured to execute the instructions stored in memory to:
share a communications channel with a mobile device, exchange data with the mobile device, using the wireless transceiver, over the communications channel,
generate a screen having graphical user interface (GUI) based on the exchanged data, wherein an appearance of the screen is based on a measurement of the wearable article performed by the sensor;
provide icons on the GUI presenting information to a user, wherein the icons are arranged in groups based upon a type of information that each icon presents,
arrange a first plurality of icons into a first group, wherein each icon in the first group presents a status of a presence of a physical item contained within the wearable article, further wherein the physical item contained within the wearable article comprises at least one of a pair of glasses, the mobile device, a wallet, a handbag, an umbrella, or one or more keys,
provide an interface to determine a location of the mobile device when the mobile device is not present within the wearable article, and
provide the GUI to the display.

10. The wearable article according to claim 9, further comprising:
a battery, configured to supply power to at least one of the display, the wireless transceiver, the memory, the sensor, the processor, or the mobile device.

11. The wearable article according to claim 10, wherein the wearable article comprises a handbag having at least one exterior associated with the display.

12. The wearable article according to claim 11, wherein the handbag comprises:
a strap having an electrical connector removeably coupled to a portion of the strap, wherein the electrical connector is configured to provide power to charge at least one of the battery or the mobile device.

13. The wearable article according to claim 9, wherein the display comprises a static display which maintains the presentation of the graphical user interface without being refreshed, and
wherein the wireless transceiver supports a wireless communications channel based upon a wireless standard which includes at least one of Bluetooth, Bluetooth LE 4.0, WiFi (802.11x), or Wireless USB.

14. The wearable article according to claim 9, wherein the instructions to share a communications channel further cause the processor to:
wirelessly receive an initiation signal from the mobile device, and
open a wireless communications channel with the mobile device in response to the initiation signal when the mobile device is placed within a proximity of the wearable article.

15. The wearable article according to claim 9, wherein the instructions to generate the screen having a graphical user interface further cause the processor to:
arrange a second plurality of icons into a second group, wherein each icon in the second group presents an information item relating to the mobile device, wherein an information item comprises at least one of a battery level of the mobile device, a number of unanswered calls to the mobile device, a number of new text messages to the mobile device, a number of new emails to the mobile device, weather information being reported to the mobile device, or a number of steps reported by a pedometer within the mobile device.

16. The wearable article according to claim 9, wherein the instructions to generate the screen having the graphical user interface further cause the processor to:
provide information stored on the mobile device relating to at least one of calendar events, task list items, or content received from social networking services.

17. The wearable article according to claim 9, wherein the instructions to generate the screen having the graphical user interface further cause the processor to:
provide at least one of text or graphics relating to information which changes dynamically upon at least one context associated with the wearable article, wherein the at least one context comprises at least one of a location of the wearable article, a time, a date, or a presence of a payment terminal within a proximity of the wearable article.

18. A non-transitory computer-readable medium comprising instructions, which, when executed by a processor, causes the processor to:
share a communications channel with a mobile device;
exchange data with the mobile device over the communications channel;
generate a screen having a graphical user interface (GUI) based on the exchanged data, wherein an appearance of the screen is based on a measurement of wearable article;
provide icons on the GUI presenting information to a user, wherein the icons are arranged in groups based upon a type of information that each icon presents;
arrange a first plurality of icons into a first group, wherein each icon in the first group presents a status of a presence of a physical item contained within the wearable article, and wherein the physical item contained within the wearable article comprises at least one of a pair of glasses, the mobile device, a wallet, a handbag, an umbrella, or one or more keys;
provide an interface to determine a location of the mobile device when the mobile device is not present within the wearable article; and
provide the graphical user interface to a display, wherein the display is coupled to a wearable article.

* * * * *